United States Patent [19]

Onanian

[11] Patent Number: 4,796,985
[45] Date of Patent: Jan. 10, 1989

[54] OPTICAL WAVE GUIDE LIGHT COLLECTOR FOR MICROSCOPE

[76] Inventor: Richard A. Onanian, 85 Irving St., Arlington, Mass. 02174

[21] Appl. No.: 29,177

[22] Filed: Mar. 23, 1987

Related U.S. Application Data

[63] Continuation-in-part of Ser. No. 16,580, Feb. 19, 1987.

[51] Int. Cl.4 .............................................. G02B 21/06
[52] U.S. Cl. ..................................... 350/523; 350/528
[58] Field of Search ............................... 350/523–528; 362/32; 250/227

[56] References Cited

U.S. PATENT DOCUMENTS

| 3,088,037 | 4/1963 | Baum | 250/227 |
|---|---|---|---|
| 3,103,546 | 9/1963 | Kapany | 250/227 |
| 3,142,235 | 7/1964 | Siegmund | 362/32 |
| 3,439,157 | 4/1969 | Myles | 362/32 |
| 3,669,524 | 6/1972 | Shio | 350/523 |
| 3,971,621 | 7/1976 | Albrecht-Buehler | 350/528 |
| 4,285,568 | 8/1981 | Elgart | 350/528 |
| 4,525,031 | 6/1985 | Mori | 362/32 |

FOREIGN PATENT DOCUMENTS

| 24305 | 3/1981 | Japan | 362/32 |

Primary Examiner—John K. Corbin
Assistant Examiner—Martin Lerner
Attorney, Agent, or Firm—Joseph S. Iandiorio; Brian M. Dingman

[57] ABSTRACT

An optical wave guide light collector includes a light pipe with a first, smaller end for disposition proximate an area to be illuminated and a second, enlarged end for disposition in the field of ambient light; a collector element directs ambient light from a wide field of view to the enlarged end of the light pipe.

18 Claims, 6 Drawing Sheets

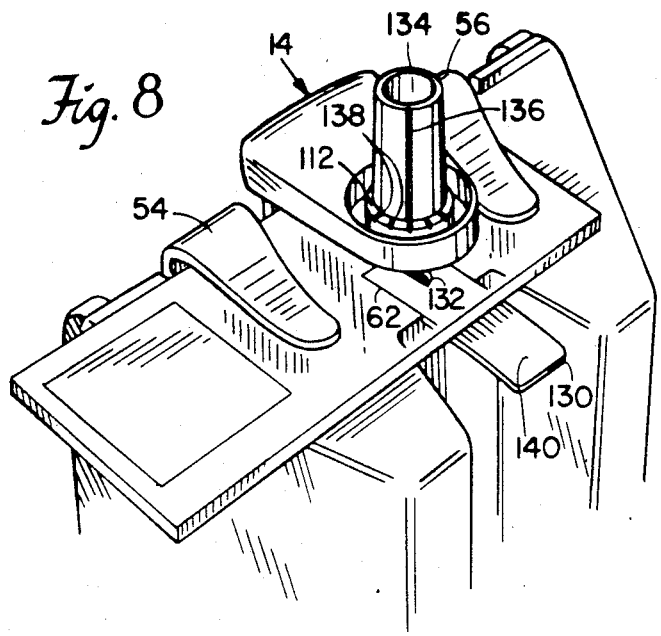
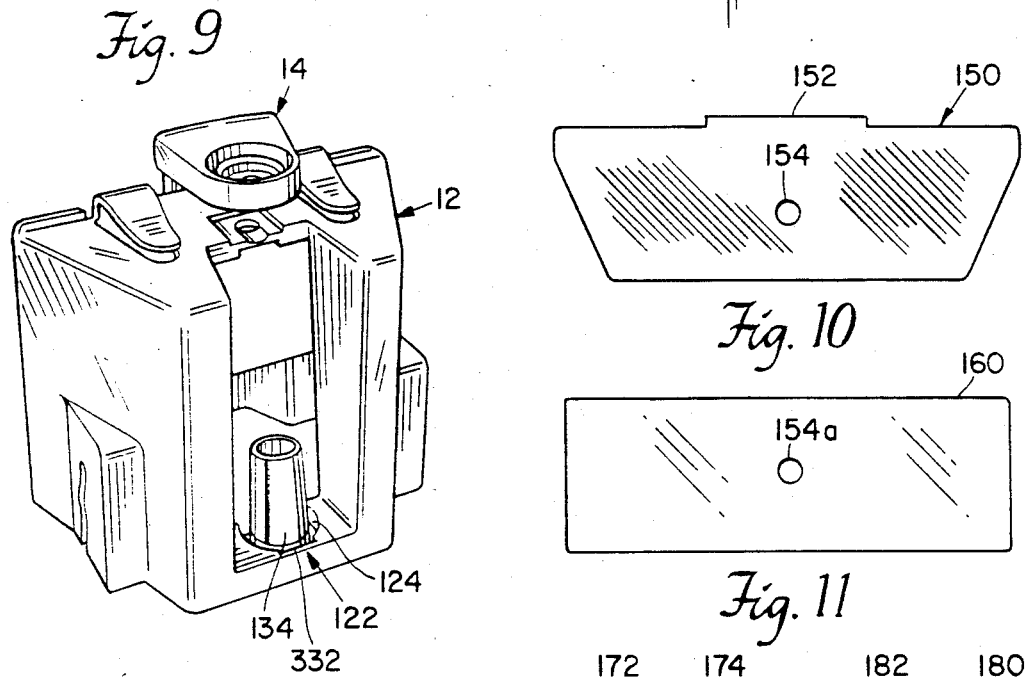
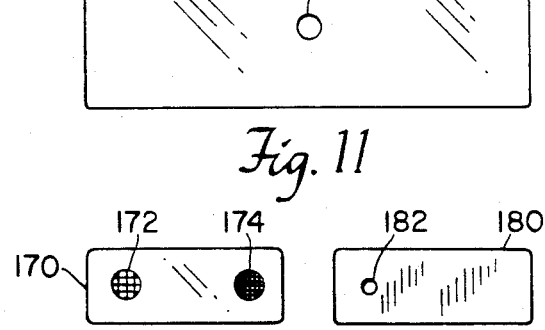
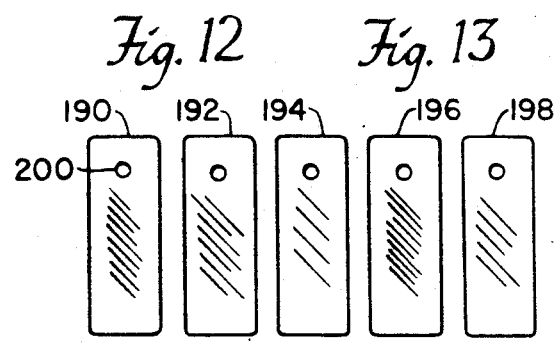

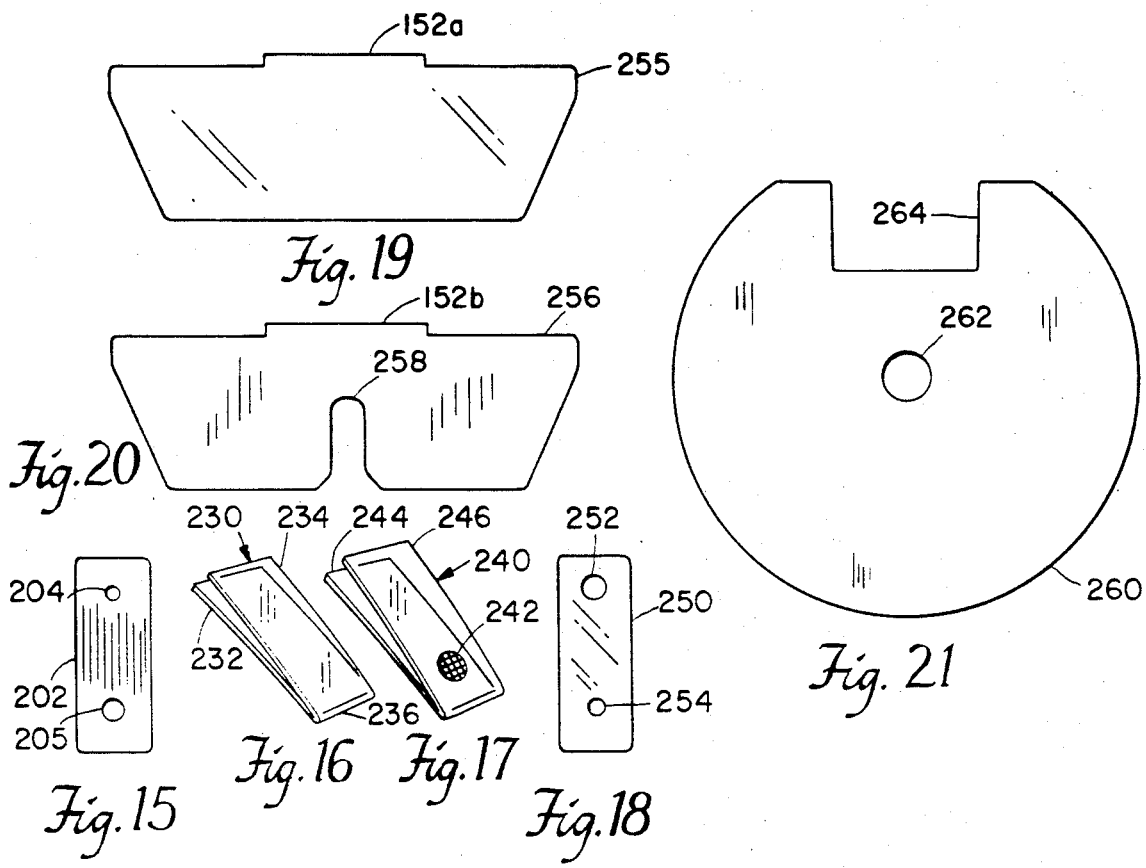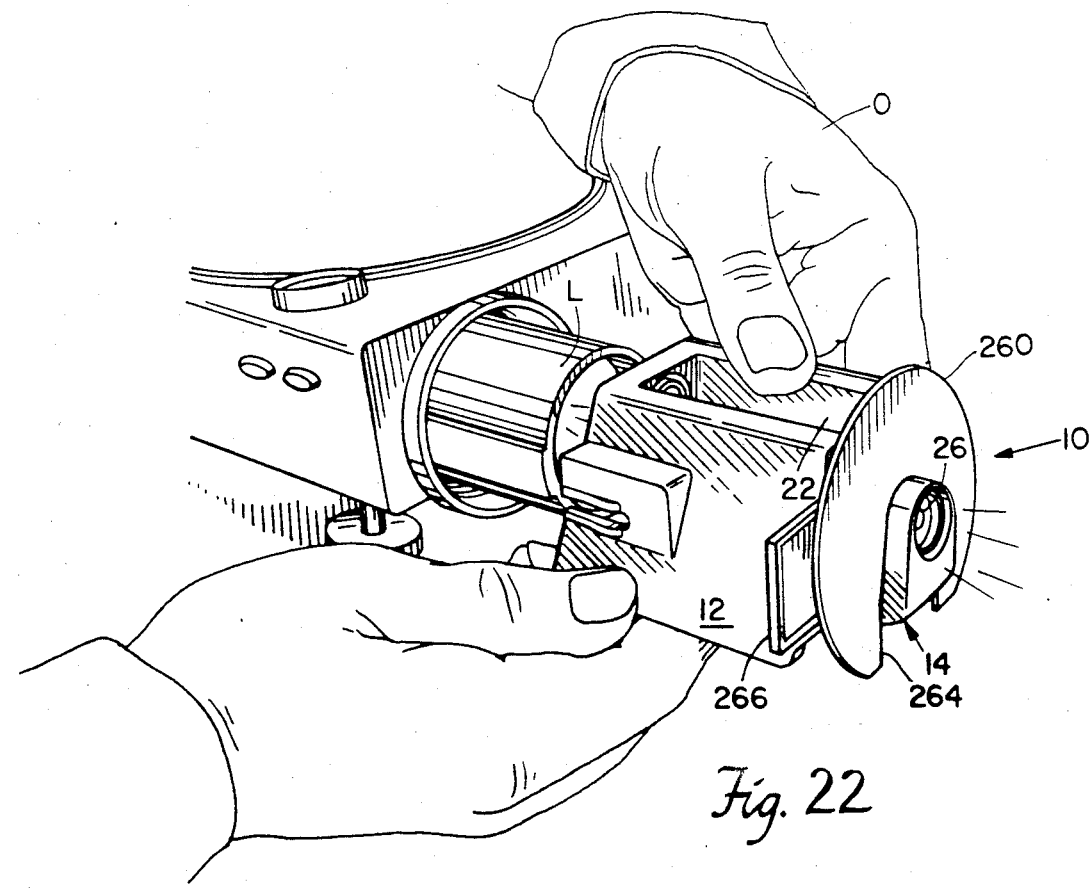

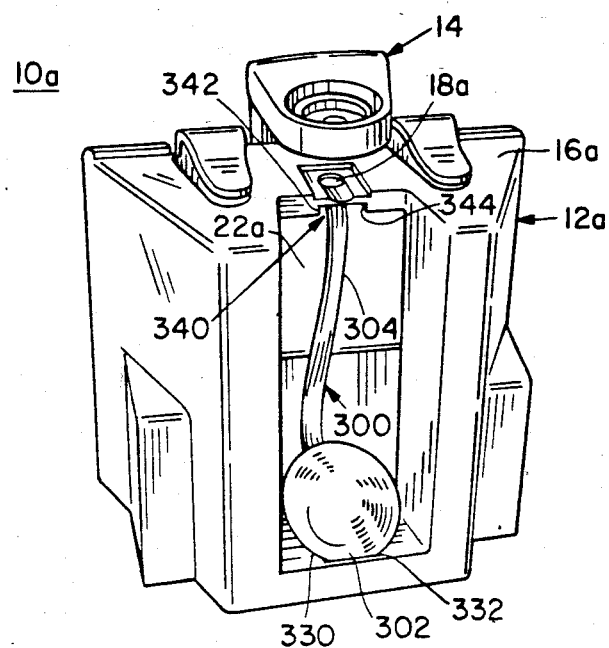
Fig. 23
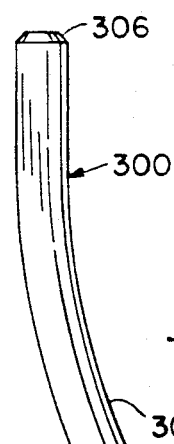
Fig. 24
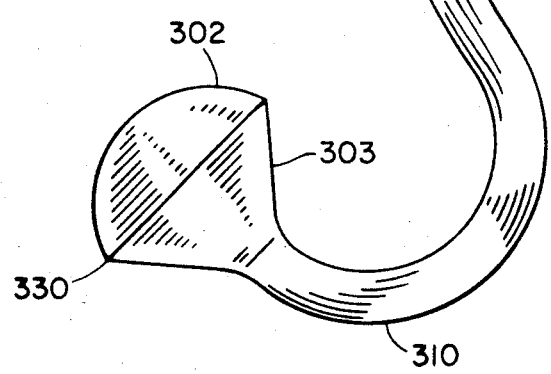

OPTICAL WAVE GUIDE LIGHT COLLECTOR FOR MICROSCOPE

RELATED CASE

This application is a continuation-in-part of U.S. patent application Ser. No. 016,580, filed Feb. 19, 1987, Microscope System, Richard A. Onanian.

FIELD OF INVENTION

This invention relates to an optical wave guide light collector for a microscope, and in particular to such a collector which collects ambient light from a wide field of view and concentrates it at the specimen stage.

BACKGROUND OF INVENTION

An essential part of every microscope system is the provision of sufficient illumination at the specimen stage so that the specimen can be properly viewed. In expensive and sophisticated microscopes there is included an independent light source for this purpose. In less expensive and less sophisticated microscopes there is typically no separate source and so there must be a mechanism for gathering available ambient light and then directing it precisely to the specimen stage. First, to maximize illumination the microscope must be oriented directly toward the ambient source; this is not always possible and may in fact interfere with the task at hand. Next the collector surface or mirror must be angled precisely to direct the light to the specimen stage and lens. This requires a very delicate touch and is easily upset by bumping or jarring the instrument. This is quite a common problem since the primary users of these less expensive, less sophisticated microscopes are students and amateurs.

SUMMARY OF INVENTION

It is therefore an object of this invention to provide an improved illumination source for a microscope.

It is a further object of this invention to provide such an improved illumination source which uses an optical wave guide and collector lens.

It is a further object of this invention to provide such an improved illumination source which collects available light over a wide field of view.

It is a further object of this invention to provide such an improved illumination source which has a small output end to concentrate light at the specimen stage and a large collector end to establish a wide cone of admittance for ambient light.

It is a broader object of this invention to provide an optical wave guide light collector generally useful for collecting ambient light over a wide field of view and concentrating it at a small area.

The invention features an optical wave guide light collector including a light pipe having a first, smaller end for disposition proximate an area to be illuminated and a second, enlarged end for disposition in the field of ambient light. A collector element directs ambient light from a wide field of view to the enlarged end of the light pipe. The optical wave guide light collector may be used with a microscope wherein the area to be illuminated is the specimen stage and the collector element and light pipe act to concentrate at the specimen stage the ambient light collected.

In a preferred embodiment the large end of the light pipe may be generally conical in shape and may have a conical angle of approximately 45°. The collector element may be a lens and may have an angle of admittance of approximately 45°. The lens may be fixed to the enlarged end of the light pipe.

In a specific embodiment the optical wave guide light collector may be utilized in a microscope system having a base including an integral stage section for holding a specimen to be viewed and an eyepiece section adjustably mounted to the base for holding a lens. There is a lens in the eyepiece section and a stage hole in the stage section which is aligned with the lens. There are means for finely adjusting the position of the eyepiece section relative to the base to adjust the focus of the lens and the optical wave guide light collector which includes a collector element and a light pipe, is interconnected between the collector element and the stage hole for transmitting the collected light to the specimen being viewed.

DISCLOSURE OF PREFERRED EMBODIMENT

Other objects, features and advantages will occur from the following description of a preferred embodiment and the accompanying drawings, in which:

FIG. 8 is an axonometric view of the microscope with a polarizing eyepiece and tab mounted thereto;

FIG. 9 is an axonometric view of the microscope with the polarizing eyepiece of FIG. 8 mounted in the base recess;

FIG. 10 is a top view of a specimen-centering slide according to this invention;

FIG. 11 is a top view of a liquid specimen slide used with the microscope;

FIG. 12 is a top view of a reticled tab according to this invention;

FIG. 13 is a top view of a diffuser/spotlighting tab;

FIG. 14 is a top view of a color filtering tab;

FIG. 15 is a top view of an aperture reduction tab;

FIG. 16 is a top view of a preferred accessory plate;

FIG. 17 is a top view of an alternative accessory plate;

FIG. 18 is an axonometric view of a hinged specimen tab according to this invention;

FIG. 19 is an axonometric view of a hinged tab with a reticle;

FIG. 20 is a top view of a liquid specimen tab;

FIG. 21 is a top view of a mask for use on the microscope in microprojection applications;

FIG. 22 is an axonometric view of the microscope being utilized for microprojection;

FIG. 23 is an axonometric view of an alternative microscope according to this invention which uses a fiber optic wave guide to direct light to the specimen being viewed; and FIG. 24 is an elevational side view of the wave guide of FIG. 23.

Figure 1A:
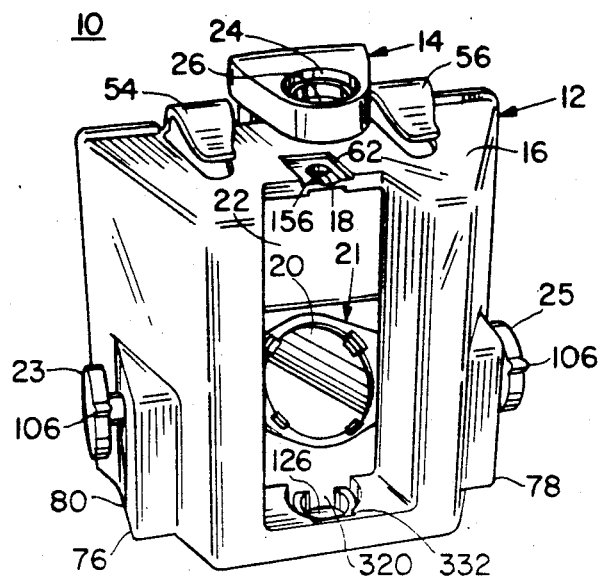
FIG. 1A is an axonometric front view of a preferred microscope system according to this invention.
Figure 1B:
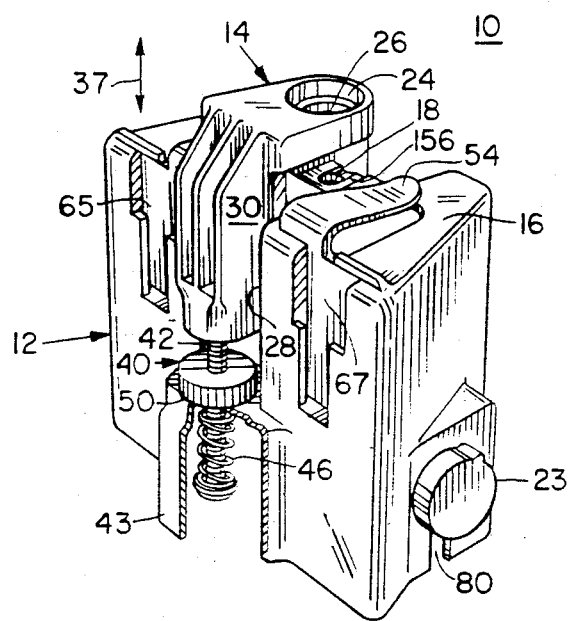
FIG. 1B is an axonometric rear view of the microscope of FIG. 1A.
Figure 2:
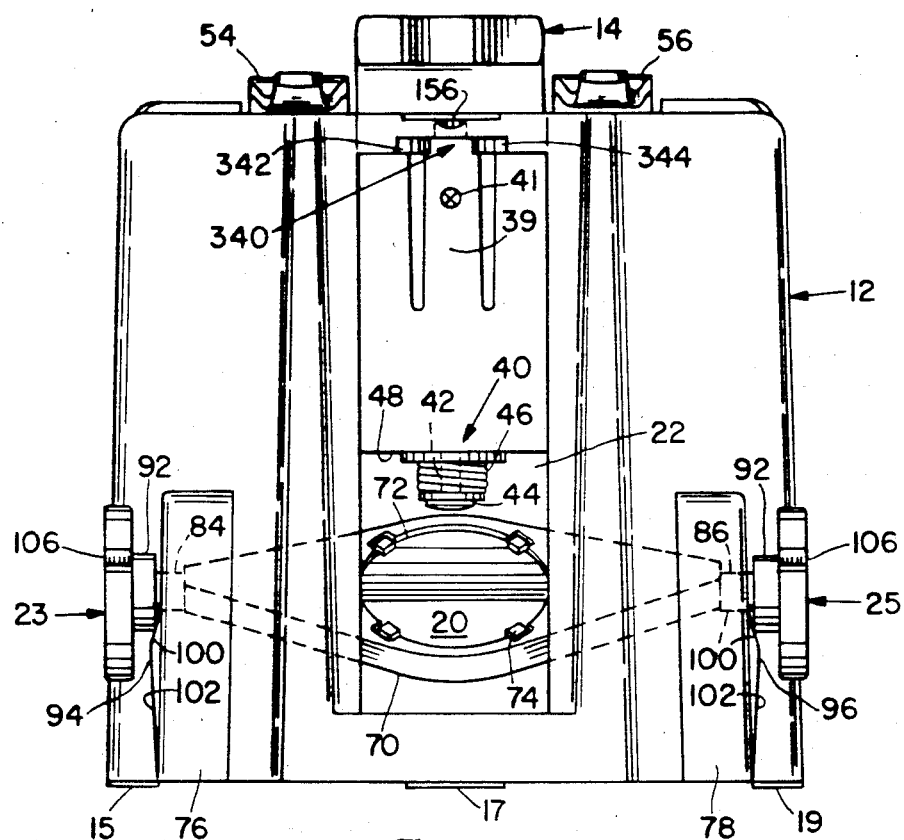
FIG. 2 is an elevational rear view of the microscope.

There is shown in FIGS. 1A and 1B a microscope 10 including a base 12 and an eyepiece section 14. Base 12 is typically molded or otherwise formed from a lightweight but durable material such as plastic. The top of the base includes an integral stage section 16 on which lenses, tabs and other optical elements are mounted as described more fully below. Stage section 16 includes a stage hole 18 through which light passes for illuminating the object being viewed. This light is directed to stage hole 18 by a mirror 20 which as shown most clearly in FIG. 2 is mounted by an assembly 21 within a central cavity 22 in base 12. The position of assembly 21 and therefore mirror 20 may be angularly adjusted by knobs 23 and 25 in a manner described more fully below. As shown in FIG. 2, three projections 15, 17 and 19 are provided along the bottom edge of base 12 to provide microscope system 10 with a level foundation so that undesirable tipping and rocking of the device and viewing disruptions are reduced.

Lens section 14 is also composed of a lightweight material such as plastic and includes an opening 24 in which is mounted a lens 26. The lens is aligned with stage hole 18 so that the operator looking through lens 26 may view objects positioned above the stage hole.

Figure 3:
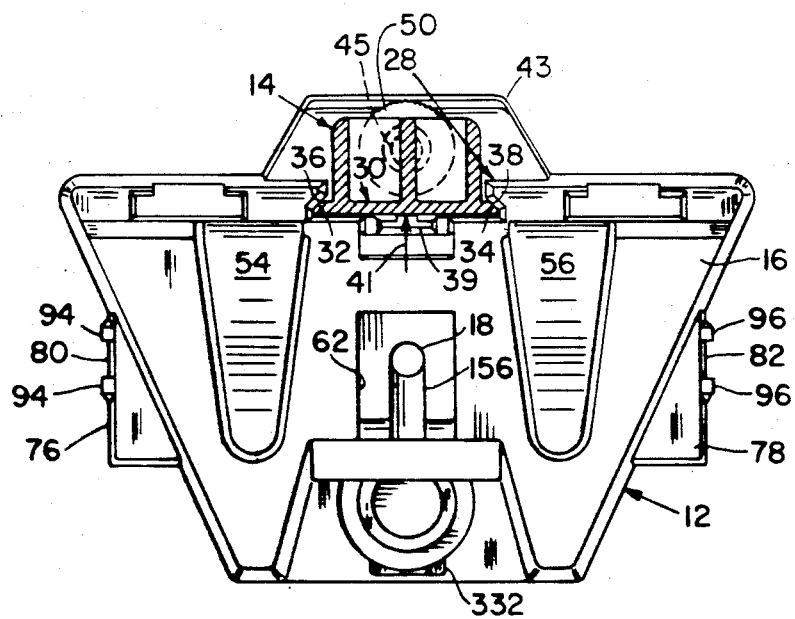
FIG. 3 is a top view of the base and the bearing portion of the eyepiece section with the remainder of the eyepiece cut away for clarity.

As illustrated in FIGS. 1B and 3, base 12 includes a vertical guide 28 in its rearward surface. Eyepiece section 14 includes a bearing portion 30 which is received within guide 28. In particular, bearing portion 30 includes beveled surfaces 32 and 34 which engage complementary beveled surfaces 36 and 38 of guide means 28. As shown in FIGS. 2 and 3, base 12 includes a spring portion 39 formed integrally in the rear surface of the base and biased outwardly in the direction of arrow 41 to bear against bearing portion 30 of eyepiece section 14 and urge beveled surfaces 32 and 34 against the beveled surfaces 36 and 38 of base guide 28. The guide is longer than bearing surfaces 32 and 34 so that eyepiece section 14 is able to slide up and down in the direction of double headed arrow 37 relative to base 12. This enables the operator to properly focus lens 26 on the object being viewed.

Fine adjustment of eyepiece section 14 relative to base 12 is provided by a screw-type adjustment unit 40, FIGS. 1B and 2. This adjustment includes a screw 42 which is threaded to the bottom of eyepiece section 14 and slideably received by base 12 through hole 45 in the upper surface of base projection 43. As seen most clearly in FIG. 2, the lower end of screw 42 extends into base cavity 22 and includes a head 44. A helical compression spring 46 wound about screw 42 extends between head 44 and the inside upper surface 48 of projection 43. This compression spring urges screw 42 downwardly so that eyepiece 14 is always resiliently movable in a biased condition resulting in zero backlash.

Fine adjustment 40 also includes an adjusting wheel 50 which threadably engages screw 42 and is mounted above the top surface of projection 43. Fine adjustment 40 is operated to selectively raise and lower eyepiece section by engaging adjusting wheel 50 with the thumb and turning the wheel in the desired direction, e.g., clockwise to raise and counterclockwise to lower eyepiece section 14. Because the bearing portion 30 of eyepiece section 14 is urged into snug engagement with guide 28 by base spring 39, the relative movement of the eyepiece within the base is firm and precise. Looseness or play between the parts is reduced and fineadjustability is improved. Spring 46, FIG. 2, further contributes to the firm precise feel of adjustment means 40 by assisting the lowering of eyepiece 14 and resisting the raising of the eyepiece because it is under constant bias.

Figure 5:
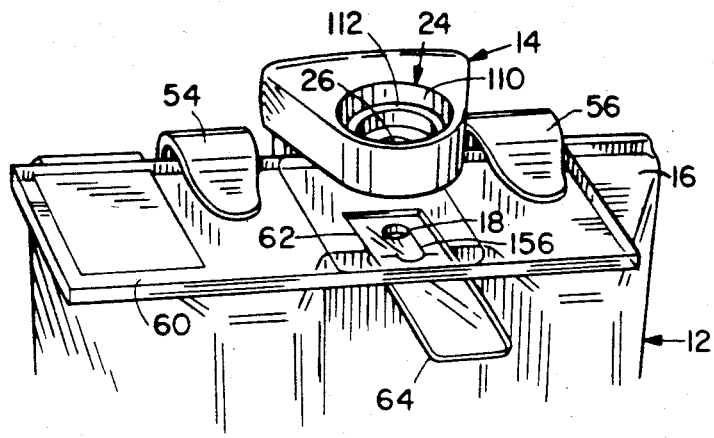
FIG. 5 is a partial axonometric view of the stage section with a tab and specimen slide mounted thereon.

A pair of resilient stage clips 54, 56 are formed integrally with stage section 16 which is in turn formed integrally with the base. These retaining members extend laterally across stage section 16 and, as shown in FIG. 5, serve to hold a specimen slide 60 on stage section 16 above stage hole 18.

Stage section 16 further includes a channel 62 which extends laterally across the stage section. Stage hole 18 is disposed through the bottom of channel 62. The channel is provided for holding one of a variety of complementarily shaped slide tabs 64 in the manner shown in FIG. 5 so that the slide tab is held in registration with stage hole 18 when it is used in conjunction with a conventional sized microscope slide or other securing means. Examples of particular slide tabs which may be employed with this invention and their particular uses are described more fully below. As shown in FIG. 1B, a pair of external pockets 65, 67 may be formed integrally in the rearward face of base 12 for accommodating specimen tabs 64 and any other tabs as required.

Figure 4:
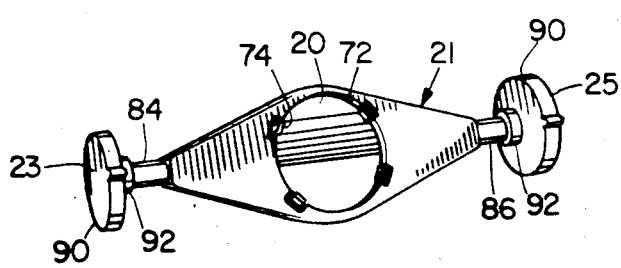
FIG. 4 is an axonometric view of an angularly adjustable mirror assembly used in the microscope of FIGS. 1A-3.

Light from a source external to microscope 10 is received by mirror 20 within cavity 22 and reflected upwardly through the stage hole and the specimen being viewed, including any slides and tabs being utilized, to lens 26. Adjustable mirror assembly 21, shown alone in FIG. 4 includes a central circular recess 72 around which are disposed a plurality of resilient fingers 74, FIGS. 2 and 4. These fingers are biased to hold mirror 20 within recess 72 but they may be retracted to introduce the mirror into or remove the mirror from assembly 21. The adjustable mounting mechanism is itself mounted to base 12 in the manner shown most clearly in FIG. 2. Base 12 includes a pair of wedge-shaped projections 76 and 78 which extend from opposite sides of the base. As shown in FIGS. 1A, 1B and 3, each wedge-like projection includes a generally vertical slot 80, 82 that extends upwardly from the bottom edge of the base. Slots 80 and 82 are aligned so that they receive respective necks 84 and 86, FIGS. 2 and 4, of assembly 21. Knobs 23 and 25 are attached at the ends of necks 84 and 86 respectively and each knob includes an outer large diameter portion 90 and an inner reduced diameter bearing portion 92.

Mounting assembly 21 is held snugly in place within slots 80 and 82 by a resilient locking means formed integrally in base 12 and including a pair of resilient convex portions 94, 96, FIGS. 2 and 3. Each convex section is located adjacent to the edges of a respective slot 80, 82 and is biased into an extended condition in which the distance between the apexes of the respective convex sections is greater than the distance between the inner surfaces of respective bearing portions 92 of knobs 23 and 25. Each convex section includes a first tapered surface 100 which extends between the inner end of the slot and the apex and a second reversed tapered portion 102 which extends between the apex and the entrance of the slot. To mount mounting assembly 21 and its mirror 20 within base 12 the necks 84 and 86 of the mounting assembly are aligned with respective slots 80 and 82 and assembly 21 is urged into the slots. Bearing portions 92 of knobs 23 and 25 slide along tapered surfaces 102 of convex portions 94 and 96 respectively and the convex portions are gradually squeezed inwardly because of the resiliency provided by the base design until knobs 23 and 25 pass over the apexes of the convex portions. Bearing portions 92 then slide over reverse tapered surfaces 100 of the respective convex portions. The convex portions of the base again expand outwardly but never to their original position and, as a result, bearing portions 92 and the entire mounting assembly 21 are urged toward, and are constantly biased against, the tops of slots 80 and 82. The mirror mounting assembly is thereby held in a constantly tensioned grip so that it may be precisely angularly rotated with a minimum of "play". The snug fit also prevents the mirror from becoming accidentally disrupted during use because it is continuously damped. Proper positioning is further assisted by a pair of ribs 106 which are formed in the large diameter outer portions 90 of knobs 23 and 25 and which indicate the angular orientation of the mirror by finger sensing. This eliminates the need for the user to disrupt operation by removing his eyes from the eyepiece to see the actual mirror position.

Opening 24 of eyepiece section 14, FIG. 5, includes an annular recess 110 which surrounds an annular mounting ring 112 that in turn holds lens 26. Recess 110 is provided for accommodating an auxiliary lens such as compound lens 114, FIG. 6. The upper end of lens 114 includes an ocular piece 116 which is attached to reduced diameter tube 118. The reduced diameter tube is slidably received within a large diameter tube 120 so that the focus of compound lens 114 may be adjusted in the direction of double-headed arrow 122. The distal end of large diameter tube 120 is received by recess 110 in eyepiece 14 so that the compound lens 114 is held securely in place by friction.

Figure 6:
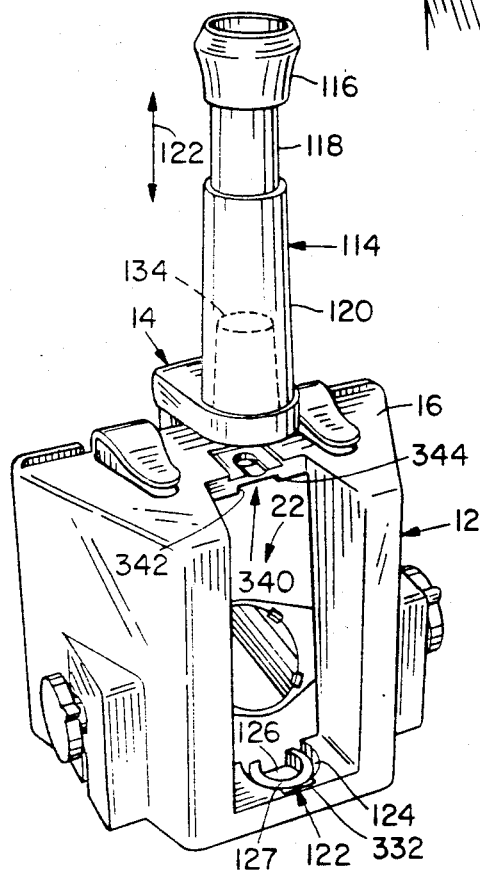
FIG. 6 is a partial axonometric view of the microscope with a compound lens attached to the eyepiece.
Figure 7:
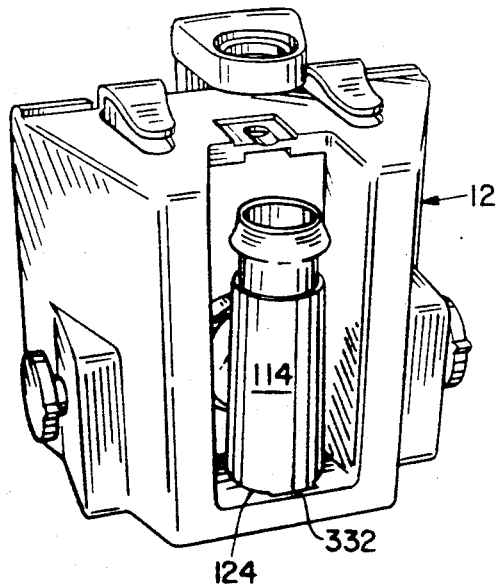
FIG. 7 is an axonometric view of the front of the microscope with a compound lens stored in a recess in the base.

As shown in FIG. 6, as well as in FIGS. 1A and 3, base 12 includes a recess 122 disposed near the bottom of the base proximate the entrance to cavity 22. More specifically, recess 122 includes an outer semi-annular outer recess 124 and an inner recess 126 separated by an arcuate portion 127. As shown in FIG. 7, the lower distal end of large tube 120 of compound eyepiece 114 fits within outer recess 124 so that compound lens attachment 114 may be stored within cavity 122 when not in use.

A polarizing kit which may be employed with microscope 10 and which enables the user to view any specimen under polarized light is shown in FIG. 8. The kit includes a polarizing tab 130 having a longitudinal polarizing axis and a semicircular aperture 132 proximate one end. The aperture 132 may need not be any particular shape so long as it provides a split viewing aperture. This is useful with other tabs as well, e.g. color, reticle. As with all other tabs, the polarizing tab must be used in conjunction with a microscope slide or some other plate inserted under the stage clips containing the specimen to be polarized so that a slot is formed to receive and retain the tab. The kit further includes a polarizing eyepiece 134 having a longitudinal notch 136 formed on the exterior of the eyepiece which indicates the polarizing axis of the eyepiece. The lower end of eyepiece 134 fits snugly within mounting ring 112 of eyepiece section 14. By rotating polarized eyepiece 134 within ring 112, the polarizing axis of the eyepiece relative to that of tab 130 is varied. A series of graduations or markings 138 are provided about ring 112 and by aligning vertical groove 136 on eyepiece 134 with markings 138 the operator can determine the relative angularity between the two polarizing axes. Semicircular aperture 132 permits the operator to view a portion of the specimen with unpolarized light at the same time as the remainder of the specimen is being viewed with polarized light. Totally polarized viewing is provided simply by reversing tab 130, e.g., by removing the apertured end of the tab from channel 62 and inserting the wholly polarized end 140 into the channel. The compound lens shown in FIG. 6 may be utilized in conjunction with the polarizing kit simply by mounting the lens over polarizing eyepiece 134 onto eyepiece section 14 within eyepiece recess 110 as shown in FIG. 6.

When the polarizing kit is no longer in use, eyepiece 134 is removed from eyepiece section 14 and, as shown in FIG. 9, inserted within inner recess 126 of recess 122. The compound lens may be placed completely over polarizing eyepiece 134 and received within outer recess 124 as previously shown in FIG. 7.

A specimen centering slide 150 which may be utilized in microscope 10 is shown in FIG. 10. Slide 150 fits on stage section 16 beneath resilient retaining members 54 and 56 and includes a rearward projection 152 which fits snugly between the two retaining members. As a result, the specimen on slide 150 is automatically centered above stage hole 18. Slide 150 may also include a central hole 154 which receives a liquid specimen to be viewed. A specimen droplet is introduced into hole 154 and held therein by surface tension; slide 150 is then positioned on stage section 16 and slid beneath retaining members 54 and 56 until hole 154 is positioned over the stage hole. As shown in FIGS. 1 and 1B, 3 and 5, a shallow groove 156 extends laterally from stage hole 18 to the front edge of stage section 16. As slide 150 is inserted into and removed from stage section 16, groove 156 accommodates the specimen in hole 154 so that the liquid specimen does not make contact with the stage and is not smeared or otherwise disturbed. A conventional sized microscope slide 160, FIG. 11, may also be provided with a liquid specimen accommodating hole 154a.

The specimen tabs may include one or more optical features. For example, as shown in FIG. 12, tab 170 includes a reticle or grid 172 proximate one end of the tab and a different scaled reticle or grid 174 at the other end. One grid may include, for example, 0.1 inch squares and the other grid may include 0.01 inch squares. However, such dimensions are for illustrative purposes only and are not meant to limit this invention. In order to make viewing and scaling easier certain of the grid lines, for example, every tenth line, may be bold. Tab 170 is inserted within channel 62 as previously illustrated in FIG. 5 so that one of the grids is disposed in the field of view and automatically centered over the stage hole. Typically, the tab is inserted beneath a slide containing specimen to be measured. In order to maintain the specimen and the selected grid on tab 170 in focus, the specimen and grid should be located in essentially the same focal plane. Therefore, at low magnifications, after the specimen slide has been inserted on stage 16, tab 170 should be introduced into channel 62 with the respective grid 172 or 174 faced upwardly against the bottom of the slide. When higher magnifications are desired, the respective focal planes of the grid and specimen may be narrowed even further by reversing the specimen slide and placing the specimen cover slip directly against tab 170.

Diffuser tab 180, FIG. 13, may be employed to improve the optical quality of the magnified image by providing diffusing light. This can be of assistance where the light directed through the stage hole is poorly distributed, overly bright or where the specimen is very thin. Tab 180 further includes an aperture 182 at one end. When this apertured end is inserted in the stage channel 62, a small portion of brighter undiffused light is provided along with the diffuse light so that a specific portion of the specimen is highlighted by a spotlight.

Various color filtering tabs 190 through 198, FIG. 14, may be utilized to provide the specimen with a tint of any desired color. A small aperture 200 is provided at one end of each such color filtering tab to provide an unfiltered image which contrasts with the tinted image. Tab 202, FIG. 15, is made opaque with small different sized apertures 204 and 205 proximate each end that can be used to reduce, as desired, the aperture provided by stage hole 18.

Although the specimen tabs have been heretofore illustrated as optical elements for providing desired viewing characteristics in connection with the specimen being viewed, such tabs may also be employed to hold the specimen itself. When used to hold specimens, tabs must be employed in combination with an accessory plate, such as 255 or 256, to create the slot necessary to retain the tabs. For example, a hinged specimen tab 230, FIG. 16, is a transparent device formed of two transparent sheets 232 and 234 which are hingably connected at 236 so that a specimen can be placed between them. Alternatively, a hinged grid tab 240, FIG. 17, may include a reticle or grid 242 for determining the dimensions of specimens held between sheets 244 and 246 of tab 240. A liquid specimen tab 250, FIG. 18, includes a pair of apertures 252 and 254 which accommodate variable sizes of droplets of a liquid specimen to be investigated. Here again, groove 156 prevents liquid specimen from making contact with the stage. This tab must be used with accessory plate 256 so that retaining slot 258 avoids a wipe-off of the liquid specimen via the top surface of the tab.

A transparent accessory plate 255, FIG. 19, is mounted on stage 16 beneath retaining members 54 and 56 in a manner similar to the specimen slide shown in FIG. 8. A tab may then be inserted beneath plate 255 into channel 62 as previously described. An alternative accessory plate 256, FIG. 17, may be clear or opaque and includes a lateral slot 258 which combined with groove 156 permits liquid specimen tab 250 to be introduced between plate 256 and stage 16 without smearing. Plates 255 and 256 are provided with centering projections 152a, 152b respectively, which fit between stage clips 54 and 56.

Microscope 10 may be utilized to project an image of a specimen on a screen. To accomplish this, an opaque microprojection mask 260, FIG. 21, is provided. Mask 260 includes a central hole 262 and a rectangular recess 264 in the periphery of the mask. As shown in FIG. 22, to perform microprojection a specimen slide 266 carrying a specimen is mounted as previously described on the stage section of microscope 10. The mirror or alternative light gathering device is removed from cavity 22 of base 12 and microprojection mask 260 is fitted onto eyepiece section 14 by engaging recess 264 with the back of the eyepiece section. As a result, mask 260 is positioned between specimen slide 266 and lens 26 and, in particular, hole 262 is aligned between the obscured stage hole and lens 26. Microscope 10 is held in the horizontal position shown in FIG. 22 by operator 0 and the bottom open end of base 12 is placed close to projector lens L. As a result, light passes through base 12 of microscope 10 and its stage hole and the illuminated image of the specimen is projected through hole 262 of mask 60 and lens 26 onto a screen or other projecting surface, typically two to five feet away. Hole 262 is slightly larger than the diameter of stage hole 18. As a result, opaque mask 260 blocks all illumination emanating from lens L except that which passes through the stage hole containing lens 26. The illumination striking outside of lens 26 is blocked by the mask and, as a result, a sharp clear image of the specimen is projected. By utilizing a darker room and/or a higher wattage projection lamp, larger and longer projection images can be obtained.

In accordance with this invention, FIG. 23, microscope 10a includes an optical wave guide 300 for collecting external light and transmitting that light through the stage hole for illuminating the specimen of interest. As shown most clearly in FIG. 24, the wave guide includes a rounded collecting lens 302 and a gooseneck curved light pipe 304 extending from lens 302. The distal end of light pipe 304 terminates in a beveled surface 306, which sharply illuminates the specimen. The collecting lens 302 is enlarged to accommodate the enlarged end 303 of light pipe 300 to improve collecting ability and admittance angle up to 45°. Enlarged end 303 is preferably generally conical in shape as shown, having an angle of approximately 45 degrees to provide the improved collecting ability and admittance angle of up to 45 degrees. Lens 302 is fixed to enlarged end 303 to form an integral light-collecting structure. As shown in FIG. 23, wave guide 300 fits snugly into cavity 22a within base 12a. In particular, the lower end 310, FIG. 24, of light pipe 304 snap-fits within inner recess 126, FIGS. 1A and 6, in base 12a and extends out over the rearward opening 320 of the recess. The edge 330, FIGS. 23, 24, of wave guide 300 nests snugly in the enlarged front recess 332, FIGS. 1A, 6 and 23. From there, light pipe 304 curves upwardly and tapered upper end 306 is snap-fit into stage hole 18. Beneath stage 16 is guideway 340, FIGS. 2, 6 and 23, which includes tapered sides 342, 344 for gently guiding end 306 of light pipe 304 and self-centering it at stage hole 18. The light pipe is somewhat resiliently flexible so that it may be flexed to introduce wave guide 300 into and remove it from base 12. To focus light on a specimen of interest base 12a is manipulated so that lens 302 faces the general direction of a light source. The light is then collected by lens 302 from a wide admittance angle and delivered through light pipe 304 and stage hole 18a to illuminate the specimen of interest mounted on stage 16a. The exit (distal) end of the light pipe can be given a fine matte finish so that light transmitted to the specimen/lens is always clearly diffused—regardless of the quality of light source. Although the light pipe 300 is shown specifically curved, this is not a necessary feature. It may as well be straight or have other curvatures.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A self-contained microscope system for operating in ambient light, comprising:

a base including an integral stage section for holding a specimen to be viewed and an inner cavity having access to an external ambient light source, said stage section defining a stage hole;

an eyepiece section adjustably mounted to said base for holding a lens, said eyepiece section aligned with said stage hole;

means for finely adjusting the position of said eyepiece section relative to said base to adjust the focus of said lens;

an optical wave guide light collector including a collector element and a light pipe having a first, enlarged end interconnected with said collector element and a second, smaller end for alignment with said stage hole for transmitting the collected light to the specimen being viewed; and means in said cavity for holding said collector element for disposition in a field of ambient light.

2. The microscope of claim 1 further including means, disposed in said base, for holding the smaller end of said light pipe proximate said stage hole.

3. The microscope of claim 2 in which said means for holding the smaller end of said light pipe includes guide means for centering said smaller end at said stage hole.

4. The microscope of claim 3 in which said guide means releasably holds said smaller end of said light pipe.

5. The microscope of claim 4 in which said light pipe is flexible to facilitate removal from said guide means.

6. The microscope of claim 1 in which said means for holding the enlarged end of said light pipe releasably holds said light pipe.

7. The microscope of claim 6 in which said light pipe is flexible to facilitate removal from said means for holding the enlarged end of said light pipe.

8. The microscope of claim 1 in which said second, enlarged end is generally conical in shape.

9. The microscope of claim 4 in which said conical shape has an angle of approximately 45°.

10. The microscope of claim 1 in which said collector element directs ambient light from a wide field of view to the enlarged end of the light pipe for concentration at the stage hole.

11. The microscope of claim 1 in which said collector element has an angle of admittance of approximately 45°.

12. The microscope of claim 1 in which said collector element is a lens.

13. The microscope system of claim 1 in which said collector element is fixed to said enlarged end of the light pipe.

14. The microscope of claim 1 in which said cavity communicates with said stage hole.

15. The microscope of claim 1 in which said light collector is disposed within said cavity.

16. The microscope of claim 1 in which the second, smaller end of said light pipe is believed to concentrate the ambient light on the specimen.

17. The microscope of claim 1 in which the second, smaller end of said light pipe has an end surface with a matte finish for diffusing the ambient light.

18. A self-contained microscope system for operating in ambient light, comprising:

a base including an integral stage section for holding a specimen to be viewed said stage section defining a stage hole;

an inner cavity in said base in communication with said stage hole and having access to an external ambient light source;

an eyepiece section adjustably mounted to said base for holding a lens, said eyepiece section aligned with said stage hole;

means for finely adjusting the position of said eyepiece section relative to said base to adjust the focus of said lens;

an optical wave guide light collector including a flexible light pipe having a first, enlarged end and a second, smaller end for alignment with said stage hole, said light pipe for transmitting ambient light to the specimen being viewed;

guide means in said cavity for removably holding the smaller end of said light pipe proximate and centered at said stage hole;

a wide-angle collector element attached to said first, enlarged end for collecting ambient light and concentrating it in said light pipe; and means in said cavity for removably holding said collector element in said cavity for disposition in a field of ambient light.

* * * * *